US012790110B2

(12) United States Patent
Patterson

(10) Patent No.: US 12,790,110 B2
(45) Date of Patent: Nov. 10, 2026

(54) HAULING CONTAINER AND BODY

(71) Applicant: Michael W. Patterson, Santa Monica, CA (US)

(72) Inventor: Michael W. Patterson, Santa Monica, CA (US)

( * ) Notice: Subject to any disclaimer, the term of this patent is extended or adjusted under 35 U.S.C. 154(b) by 0 days.

(21) Appl. No.: 19/425,410

(22) Filed: Dec. 18, 2025

(65) Prior Publication Data

US 2026/0125209 A1 May 7, 2026

Related U.S. Application Data

(63) Continuation-in-part of application No. 19/317,910, filed on Sep. 3, 2025.

(Continued)

(51) Int. Cl.
*B65F 1/14* (2006.01)
*B60P 1/48* (2006.01)
(Continued)

(52) U.S. Cl.
CPC *B65F 3/02* (2013.01); *B60P 1/48* (2013.01); *B65F 1/14* (2013.01); *B65F 3/20* (2013.01)

(58) Field of Classification Search
CPC ......... B60P 1/48; B62D 33/04; B62D 33/046; B62D 33/044; B65F 3/02; B65F 3/20;
(Continued)

(56) References Cited

U.S. PATENT DOCUMENTS 4,552,500 A * 11/1985 Ghibaudo ................. B65F 3/26 414/408
5,019,253 A 5/1991 Byers
(Continued)

FOREIGN PATENT DOCUMENTS

DE 4003589 A1 * 8/1991 ................ B65F 3/02
EP 0661224 A1 7/1995
(Continued)

OTHER PUBLICATIONS

Core Molding Technologies—spray up 06202021 https://coremt.com/capabilities/processes/spray-up/ (Year: 2021).*
(Continued)

*Primary Examiner* — Wenwei Zhuo
(74) *Attorney, Agent, or Firm* — Patterson + Sheridan, LLP

(57) ABSTRACT

Hauling containers, vehicles having hauling containers, and methods of forming and installing hauling containers are disclosed. In one aspect, a hauling container includes a body defining a storage volume of at least two cubic yards. The body is formed, at least in part, of a polymer material or a non-metallic recyclable material, or both. In another aspect, a vehicle includes a chassis and a hauling container removably mounted to the chassis. The hauling container includes a body defining a storage volume. The body is formed, at least in part, of a polymer material or a non-metallic recyclable material, or both. In yet another aspect, a method includes forming a body of a hauling container. The body defines a storage volume, and is formed, at least in part, of a polymer material or a non-metallic recyclable material, or both. The body is configured to sit on a chassis of a vehicle.

29 Claims, 6 Drawing Sheets

Related U.S. Application Data

(60) Provisional application No. 63/690,027, filed on Sep. 3, 2024.

(51) Int. Cl.
*B65F 3/02* (2006.01)
*B65F 3/20* (2006.01)

(58) Field of Classification Search
CPC ........ B65F 3/28; B65F 2250/114; B65F 1/00; B65F 1/14; B65F 2003/006; B65F 2003/008
USPC ........................ 296/37.6, 182.1, 183.2, 186.1
See application file for complete search history.

(56) References Cited

U.S. PATENT DOCUMENTS

| | | | | |
|---|---|---|---|---|
| 5,599,071 | A | 2/1997 | Kann et al. | |
| 2014/0298745 | A1* | 10/2014 | Rechenmacher | E04H 1/005 52/425 |
| 2015/0030419 | A1 | 1/2015 | Goedken | |
| 2021/0179199 | A1* | 6/2021 | Baker | B62D 33/046 |
| 2023/0046294 | A1* | 2/2023 | Foran | B32B 27/12 |
| 2023/0120042 | A1* | 4/2023 | Turner | B65F 3/06 381/71.1 |
| 2023/0415556 | A1 | 12/2023 | Wolf et al. | |
| 2024/0217731 | A1* | 7/2024 | Schad | B65F 3/26 |
| 2026/0062203 | A1* | 3/2026 | Patterson | B65D 88/12 |

FOREIGN PATENT DOCUMENTS

| | | | | |
|---|---|---|---|---|
| EP | 1270380 | A1 * | 1/2003 | B62D 33/00 |
| GB | 1065805 | A * | 4/1967 | B65D 90/06 |
| IE | 49467 | B1 * | 10/1985 | B65F 3/28 |

OTHER PUBLICATIONS

Formlabs—Vacuum Forming 04142019 https://formlabs.com/blog/guide-to-manufacturing-processes-for-plastics/ (Year: 2019).*

Osborne—pDCPD Molding https://www.osborneindustries.com/capabilities/pdcpd-molding/ (Year: 2017).*

International Search Report and Written Opinion received for PCT Patent Application No. PCT/US2025/044613, mailed on Nov. 5, 2025, 10 pages.

* cited by examiner

HAULING CONTAINER AND BODY

CROSS-REFERENCE TO RELATED APPLICATIONS

This application claims benefit of U.S. provisional patent application Ser. No. 63/690,027 filed Sep. 3, 2024 and is a continuation in part of co-pending U.S. non-provisional application Ser. No. 19/317,910. The aforementioned related patent applications are herein incorporated by reference in their entirety.

BACKGROUND

Refuse vehicles collect refuse (e.g., garbage, recycling, and other waste) from residences and businesses and transport the refuse to a storage or processing facility (e.g., a landfill, an incineration facility, a recycling facility, etc.). Refuse vehicles, such as garbage trucks, are limited by the weight that they carry. Refuse vehicles typically include a refuse container having a body formed of steel, with such bodies weighing between 7,500 and 22,000 pounds. The relatively heavy body of a refuse container can place considerable stress on the roads and can limit the refuse payload capability of a refuse vehicle.

SUMMARY

In one aspect, a hauling container is provided. The hauling container includes a body defining a storage volume. The body is configured to mount to a chassis and comprises a polymer material or a non-metallic recyclable material, or both.

In one or more examples, the storage volume is at least two cubic yards and the body weighs less than 2,000 pounds.

In one or more examples, the polymer material is a moldable plastic material, and wherein the body includes at least one wall formed primarily of the moldable plastic material. In at least one example, at least two walls are integrally formed with the moldable plastic material.

In one or more examples, the polymer material is acrylonitrile butadiene styrene (ABS).

In one or more examples, the body includes a unitary monolithic component that includes at least three walls that collectively define, at least in part, the storage volume.

In one or more examples, the body weighs less than 2,000 pounds and the storage volume is greater than four cubic yards.

In one or more examples, the body weighs less than 1,000 pounds and the storage volume is at least ten cubic yards.

In one or more examples, the body has stiffening elements coupled with, or embedded within, one or more walls of the body to provide structural reinforcement thereto.

In one or more examples, the body has at least one wall formed of a thermoplastic matrix combined with steel rods supported by shear stirrups.

In one or more examples, the body has at least one wall with a beam extending therethrough, and wherein the beam includes a beam matrix combined with steel rods supported by shear stirrups, and wherein the beam includes, or is wrapped in whole or in part by, a fabric layer.

In one or more examples, the body has a floor wall having a lining arranged on a top surface thereof.

In one or more examples, the body has a floor wall having a stacked arrangement with a thermoplastic layer arranged between two lining layers.

In one or more examples, the storage volume is divided into at least two compartments, with a divider wall separating the at least two compartments.

In one or more examples, the hauling container includes a blade operable to move between a first position and a second position, and wherein the blade comprises the polymer material or the non-metallic recyclable material, or both.

In one or more examples, the hauling container is removably mountable on a vehicle.

In another aspect, a vehicle is provided. The vehicle includes a chassis and a hauling container removably mounted to the chassis. The hauling container has a body defining a storage volume of at least two cubic yards. The body comprises a polymer material or a non-metallic recyclable material, or both.

In one or more examples, the vehicle includes an automatic loader mounted to the body, the automatic loader being operable to pick up one or more offboard objects and move the offboard objects into the storage volume.

In one or more examples, the body has multiple sections, including a hopper and a storage compartment.

In one or more examples, a top end of the hopper is arranged at a different height than a top end of the storage compartment, and wherein the hopper and the storage compartment are formed as a unitary monolithic component.

In yet another aspect, a method is provided. The method includes forming a body of a hauling container, the body defining a storage volume and being formed, at least in part, of a polymer material or a non-metallic recyclable material, or both. The body is configured to mount to a chassis of a vehicle.

In one or more examples, the storage volume is at least four cubic yards and the body weighs less than 2,000 pounds.

In one or more examples, forming the body includes extruding a unitary monolithic component having a floor wall, a first side wall, and a second side wall arranged opposite the first side wall, wherein the first side wall and the second side wall are each connected to the floor wall; and coupling a wall to each of the first side wall, the second side wall, and the floor wall.

In one or more examples, the polymer material is acrylonitrile butadiene styrene (ABS).

In one or more examples, the method includes removably mounting the hauling container onto a vehicle.

DETAILED DESCRIPTION

Figure 1:
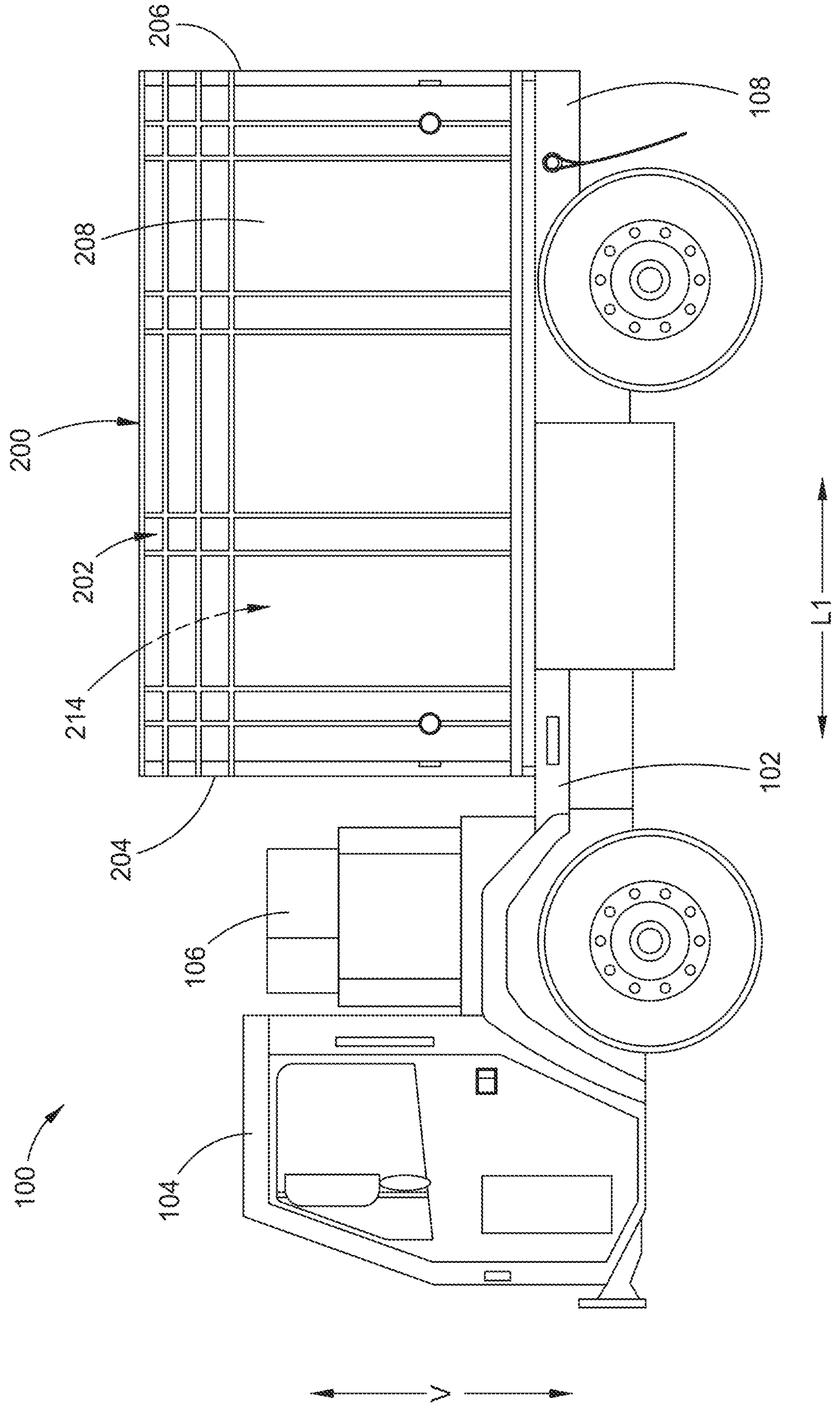
FIG. 1 is a side view of an example vehicle, according to one or more aspects of the present disclosure.

Hauling containers, vehicles having hauling containers, and methods of forming and installing hauling containers are disclosed herein. In one or more examples, a hauling container includes a body formed of a lightweight material, such as a polymer material, a non-metallic recyclable material, or both. As one example, the polymer material is acrylonitrile butadiene styrene (ABS). ABS is impact resistant, lightweight relative to steel, easy to machine, and relatively low cost relative to steel. Generally, as used herein, a "hauling container" is a container used to transport or move materials. For instance, the hauling container can be a refuse container onboard a refuse vehicle, an intermodal container, a movable storage container, a cargo container, or the like. In at least one example, the hauling container defines a storage volume of at least two cubic yards (2 $yd^3$), or rather, is at least a 2-yard hauling container.

In at least one example, a hauling container has a body that includes a unitary monolithic component having at least two walls, including, for example, a floor wall, forward wall, rear wall, side walls, and/or a roof wall that collectively form a storage volume, which can have one or multiple chambers, e.g., for functions that can include compacting, baling, and stacking. In one or more examples, the body is formed of multiple pieces. Stiffening elements can be coupled with, or embedded within, one or more of the walls to provide structural reinforcement thereto. Arms and/or accessories may be snapped onto the body, e.g., with steel-wrapped connectors or loops.

In one or more examples, the hauling container is a refuse container. The body of the refuse container can be arranged to receive refuse or other materials through an opening, and an ABS blade or other compaction mechanism can move the refuse through the opening or can alternatively eject refuse through the opening. An ABS gate assembly can be mounted to the body to serve as a closure for an opening at the rear of the body and can be movable between normal closed and opened positions. Further, an automatic loader can be mounted to the body, e.g., at a front, side, and/or rear of the refuse vehicle. The automatic loader is operable to pick up one or more offboard objects and move the offboard objects into the storage volume of the refuse container. The refuse container can be printed to any suitable standard or new size, e.g., by injection molding, an extrusion process, additive manufacturing, some combination thereof, or some other process. Further, in some aspects, the body can be removably mounted on a chassis of a refuse vehicle.

The hauling containers of the present disclosure can provide certain advantages, benefits, and/or technical effects. For instance, as noted above, a refuse vehicle typically includes a hauling container (e.g., a refuse container) having a body formed of steel, with such bodies weighing between 7,500 and 22,000 pounds. In contrast, a body formed of a lightweight material, such as ABS, can weigh under 1,000 pounds and can thus provide another 6,000-20,000 of payload capability and can generally cause less stress on the road. Further, in some example aspects, at least two walls of the body of a hauling container disclosed herein can be formed as a single, unitary monolithic component, which can reduce or eliminate the need for welding or other wall attachment techniques. In addition, the body can be removably mounted onto a chassis of a vehicle, which can allow new bodies to be secured thereto and for consumed or used bodies to be readily removed from the chassis. Moreover, in some aspects, the polymer material forming the body of a hauling container can be made from recycled materials and can itself be used to form future refuse bodies or products when at the end of its lifespan. Other advantages, benefits, and/or technical effects are contemplated.

Turning now to the drawings, FIG. 1 depicts an example vehicle 100, according to one or more aspects of the present disclosure. The vehicle 100 can be, for example, a refuse truck, a garbage truck, a waste collection truck, a sanitation truck, a recycling truck, etc. Moreover, the vehicle 100 can be front-loading, side-loading, rear-loading, or some combination thereof. For reference, the vehicle 100 defines a longitudinal direction L1, a lateral direction L2 (FIG. 2), and a vertical direction V. The longitudinal direction L1, the lateral direction L2, and the vertical direction V are mutually perpendicular to one another.

As depicted in FIG. 1, the vehicle 100 includes a chassis 102, a cab 104, a drivetrain 106, and a hauling container 200. In this example, the hauling container 200 is configured as a refuse container. The cab 104 is mounted to the chassis 102 at a front side of the vehicle 100. Components of the drivetrain 106, which is an electric drivetrain in the example of FIG. 1, can be mounted to the chassis 102 aft of the cab 104. For instance, an electric motor, one or more batteries, a controller, etc. can be mounted aft of the cab 104. In other examples, the drivetrain 106 can be a hybrid-electric or fully-gas powered drivetrain, for example. The hauling container 200 can be mounted to the chassis 102 aft of the cab 104, such as to frame rails 108 of the chassis 102. In some examples, the hauling container 200 can be bolted onto the frame rails 108. The hauling container 200 generally extends from a position aft of the cab 104 to a rear side of the vehicle 100, e.g., along the longitudinal direction L1.

Figure 2:
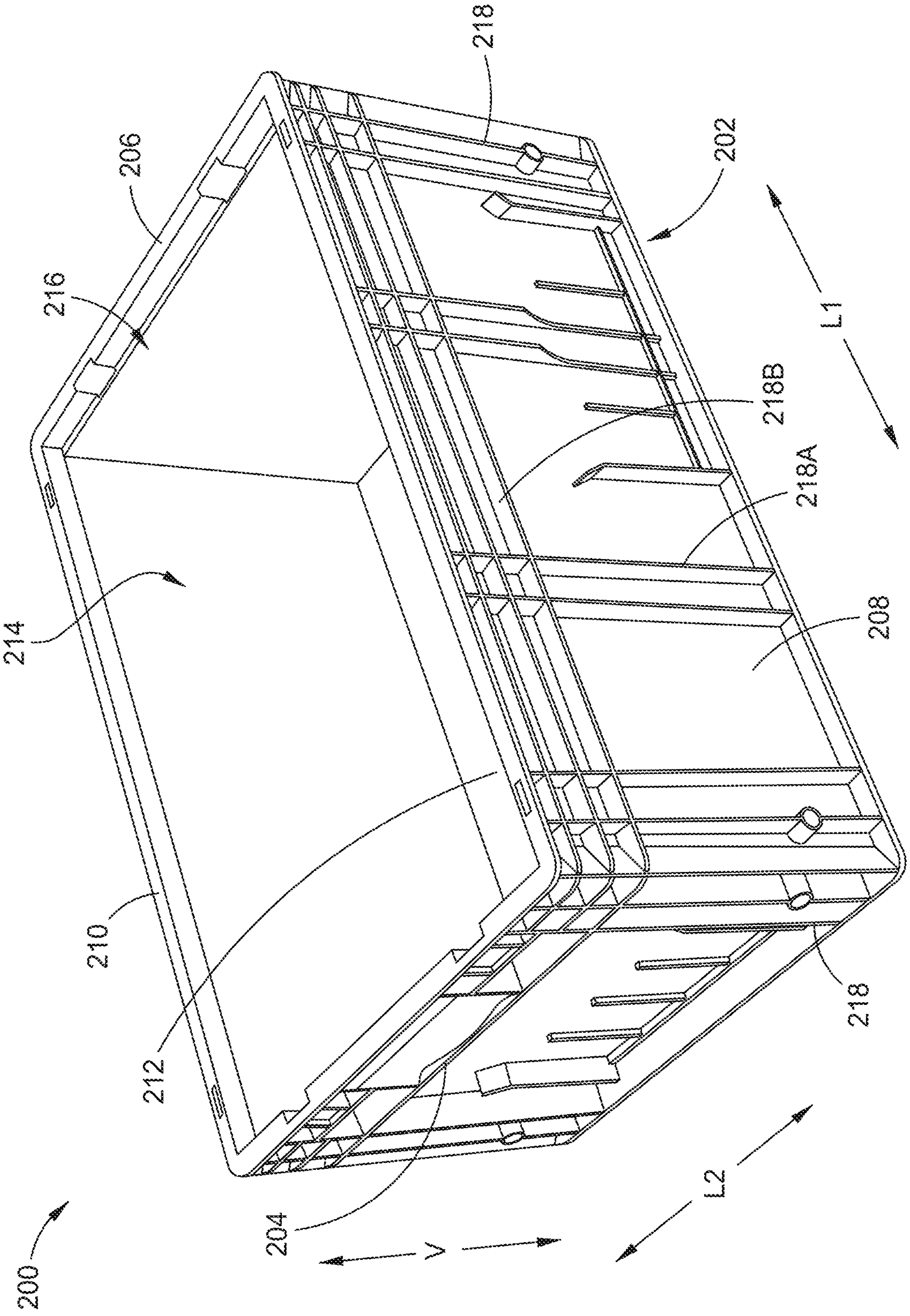
FIG. 2 is a perspective view of a hauling container of the vehicle of FIG. 1.

With reference now to FIGS. 1 and 2, the hauling container 200 will be further described. FIG. 2 depicts a perspective view of the hauling container 200 of the vehicle 100 of FIG. 1. As shown in FIGS. 1 and 2, the hauling container 200 has a body 202. In the depicted example of FIG. 1, the body 202 has a forward wall 204, a rear wall 206, a first side wall 208, a second side wall 210, and a floor wall 212. The forward wall 204 and the rear wall 206 oppose one another and are spaced from each other along the longitudinal direction L1, while the first and second side walls 208, 210 oppose one another and are spaced from each another along the lateral direction L2. The walls 204, 206, 208, 210, 212 collectively define a storage volume 214, which can store refuse or other items placed therein. The front, rear, and first and second side walls 204, 206, 208, 210 can define an opening 216 that provide access to the storage volume 214.

In some examples, although not shown, the body 202 can include a roof wall that at least partially covers the opening 216 and/or storage volume 214. In some examples, the roof can be movable, e.g., between a retracted position and an extended position. In the extended position, the roof can enclose a portion or an entirety of the opening 216, and in the retracted position, the roof can enclose less of the opening 216 than when in the extended position. In some examples, a gate assembly can be mounted to the body 202 to serve as a closure for another opening of the body 202 (e.g., a rear opening) and can be movable between normal closed and opened positions. In other examples, one or more doors can be mounted to the body 202 to serve as a closure for another opening of the body 202 (e.g., a rear opening) and can be movable between normal closed and opened positions.

In one or more examples, the body 202 includes a plurality of stiffening ribs 218. For instance, the walls 204, 206, 208, 210 can each include a wall panel, and the stiffening ribs 218 extend outward from the wall panels of their respective walls 204, 206, 208, 210. In at least one example, the floor wall 212 also includes stiffening ribs 218. The stiffening ribs 218 can provide support and rigidity and can also dampen vibrations, e.g., road vibrations. The stiffening ribs 218 can include a plurality of vertically-oriented ribs 218A (one of which is labeled in FIG. 2) and a plurality of horizontally-oriented ribs 218B (one of which is labeled in FIG. 2). The vertically-oriented ribs 218A can extend along their respective long axes in the vertical direction V, while the horizontally-oriented ribs 218B can extend along their respective long axes in a horizontal direction, which is perpendicular to the vertical direction V. As depicted in FIG. 2, the stiffening ribs 218 can extend outward from the exterior sides of the panels of the walls, such as the forward wall 204, the rear wall 206, and the first and second side walls 208, 210. At least some the vertically-oriented ribs 218A can extend substantially the vertical length of a wall (e.g., at least ninety percent (90%) of the total vertical length of the wall). Further, at least some the horizontally-oriented ribs 218B can extend substantially the horizontal length of a wall (e.g., at least ninety percent (90%) of the total horizontal length of the wall).

In one or more examples, the body 202 of the hauling container 200 can be removably mounted to the chassis 102 of the vehicle 100. That is, the body 202 can be mounted to the chassis 102 in such a way that the body 202 is secured to the chassis 102, but not permanently fixed thereto, such as by a weld or other permanent fixing means. In at least one example, the body 202 is secured to the chassis 102, e.g., via fasteners, brackets, etc. Such an arrangement can allow the body 202 to be removed, e.g. at the end of the lifespan of the body 202. In at least one example, the body 202 is slid onto the frame rails 108 of the chassis 102 or onto a track mounted to the chassis 102 and locked in place with a lock. To remove the slidable body 202 from the chassis 102, the lock can be unlocked and the body 202 can be slid off the track or frame rails 108. In some examples, wheels, rollers, or the like can be mounted to the body 202 to facilitate the sliding of the body 202 onto the chassis 102 or track thereof.

In one or more examples, the body 202 is formed as a unitary monolithic component, e.g., by an injection molding process, an additive manufacturing process, etc. For instance, the floor wall 212, the forward wall 204, the rear wall 206, and the first and second side walls 208, 210 can be printed as a single, unitary monolithic component. In some examples, the roof wall, or a stationary portion thereof, can be formed along with the other walls as a unitary monolithic component. Advantageously, by forming the body 202 as a unitary monolithic component, the need for welding and/or other fastening techniques to form the body 202 can be eliminated or reduced. The body 202 can be printed or formed to any size, including standard and new sizes, such as 6, 10, 11, 13, 16, 18, 20, 32 yards, etc.

In one or more examples, the body 202 is formed, at least in part, of a lightweight material, such as a polymer material (e.g., a thermoplastic). In one embodiment, the body 202 is formed using Polydicyclopentadiene (PDCPD) which is an engineered thermoset plastic (e.g., a polymer material) renowned for its exceptional combination of high impact resistance, strength-to-weight ratio, and resistance to harsh chemicals and temperatures. PDCPD can be created through a process called reaction injection molding (RIM) using the dicyclopentadiene (DCPD) monomer. In at least one example, the body 202 is formed primarily or mainly of a polymer material. In at least one example, the body 202 is formed of ABS, which is impact resistant and lightweight relative to steel. In this regard, the body 202 can be significantly lighter than a conventional body.

In yet other examples, the body 202 is formed of an LE linen phenolic material, Noryl®, Nylon, Torlon® polyamide-imide (PAI), Polybutylene terephthalate (PBT), polyetheretherketone (PEEK), Polyethylene terephthalate (PET), acetal, acrylic, CE canvas phenolic, DuPont Vespel® polyimide, G10/FR-4 Glass Epoxy, GPO-3 Thermoset, high impact polystyrene, Polyethylene terephthalate glycol (PETG), polycarbonate, polycarbonate film, polyester film, polyphenylene sulfide (PPS), polyphenylsulfone (PPSU), polysulfone (PSU), Ultem®, XX paper phenolic, or some combination thereof. In at least one example, at least one the walls of the body 202 is formed primarily of a synthetic or semi-synthetic polymer material that is moldable.

Further, in one or more examples, the body 202 is formed with a non-metallic recyclable material and/or polymer material, which can allow for bodies to be made from recycled materials and/or from used or consumed bodies to be recycled and the materials therefrom reused in some manner, such as to form future bodies. In this regard, the body of a hauling container can be replaceable or non-permanent. In at least one example, the non-metallic recyclable material is glass, or paper, or carboard, or some combination thereof. In yet other examples, the body 202 is formed of a self-extinguishing or flame-retardant plastic or light-weight material.

Certain advantages, benefits, and/or technical effects can be realized by a body formed of a lightweight thermoplastic, such as ABS. For instance, some hauling containers having an ABS-formed body can weigh under 1,000 pounds. Conventional bodies formed of steel can weigh between 7,500 and 22,000 pounds, for example. Accordingly, with a body formed of a lightweight thermoplastic material, another 6,000-20,000 pounds of payload capability can be achieved compared to hauling containers (e.g., refuse containers) formed of conventional materials, such as steel. In this regard, a plastic or light-weight body can increase the payload capability of a vehicle, such as a refuse vehicle. This can, among other benefits, enable more profitable daily runs (e.g., more garbage or refuse can be loaded) and less stress on the road.

In one or more further examples, the body 202 formed of a thermoplastic material can be reinforced with stiffening components. For instance, in at least one example, steel beams or rods can be coupled with, or embedded within, one or more of the walls of the body 202. As one example, in forming the body of a refuse container, stiffening elements (e.g., steel rods) can be set within a mold, and a thermoplastic material can be injected into the mold and allowed to cure around the steel stiffening elements. In this way, the steel stiffening elements can be embedded within one or more walls of the body to provide structural reinforcement thereto.

Figure 3:
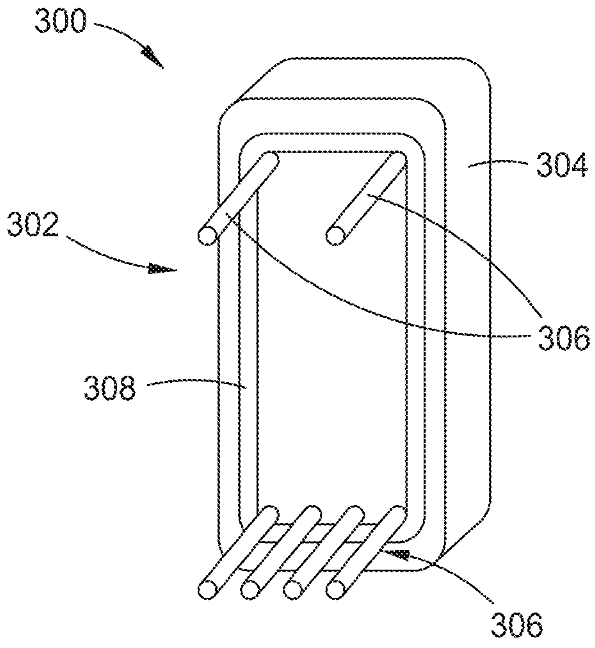
FIG. 3 is a perspective view of an example wall of a hauling container, with the wall having stiffening elements, according to one or more aspects of the present disclosure.

FIG. 3 depicts an example wall 300 of a hauling container having stiffening elements 302. One or more of the walls of the hauling container 200 of FIGS. 1 and 2 can be constructed in a same or similar manner as the wall 300 of FIG. 3.

As shown in FIG. 3, the wall 300 is formed of a thermoplastic matrix 304 combined with reinforcing materials, which in this example includes steel rods 306 supported by shear stirrups 308 (only one shear stirrup is shown in FIG. 3). The steel rods 306 can extend transversely through the thermoplastic matrix 304 and can be supported by the shear stirrups 308 spaced from one another along a transverse length of the steel rods 306. The shear stirrups 308 can withstand shear stresses and can keep the steel bars in position. The shear stirrups 308 can have a rectangular configuration, as in the depicted example of FIG. 3, or other suitable configurations. The steel rods 306 can extend a length of a wall or partially along the length of a wall. Any of the walls of the body can include such stiffening elements.

Figure 4:
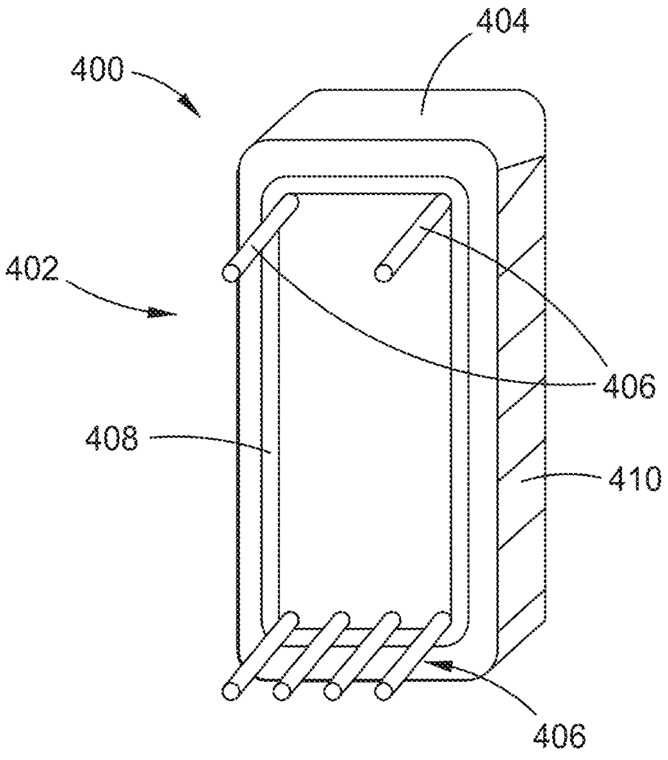
FIG. 4 is a perspective view of an example beam for a wall of a hauling container, according to one or more aspects of the present disclosure.

FIG. 4 depicts an example beam 400 that can extend through a wall of a hauling container. The beam 400 has stiffening elements 402. One or more of the walls of the hauling container 200 of FIGS. 1 and 2 can include the beam 400 of FIG. 4.

As shown in FIG. 4, the beam 400 is formed of a beam matrix 404 combined with reinforcing materials, which in this example includes steel rods 406 supported by shear stirrups 408 (only one shear stirrup is shown in FIG. 4). The beam matrix 404 can be formed of a thermoplastic material, which can be a different thermoplastic than the other portions of the wall, for example. The beam matrix 404 can be formed of other materials as well. The steel rods 406 can extend transversely through the beam matrix and can be supported by the shear stirrups 408 spaced from one another along a transverse length of the steel rods 406. The shear stirrups 408 can withstand shear stresses and can keep the steel rods 406 in position. The steel rods 406 can extend a length of the beam 400, for example. Any of the walls of the body can include such a beam.

In one or more examples, as shown in FIG. 4, the beam 400 includes, or is wrapped in whole or in part by, a fabric layer 410. In at least one example, the fabric layer 410 is a Kevlar fabric layer. The use of Kevlar fabric can enhance the flexural behavior of the beam 400. While the beam 400 in FIG. 4 is wrapped in a U-shaped fabric layer, in other examples, the fabric layer 410 can have other configurations.

In one or more further examples, a hauling container includes a body having a floor wall that is reinforced. In at least one example, one or more linings can be incorporated into the body, such as on or within the floor wall. Examples are provided below.

Figure 5A:
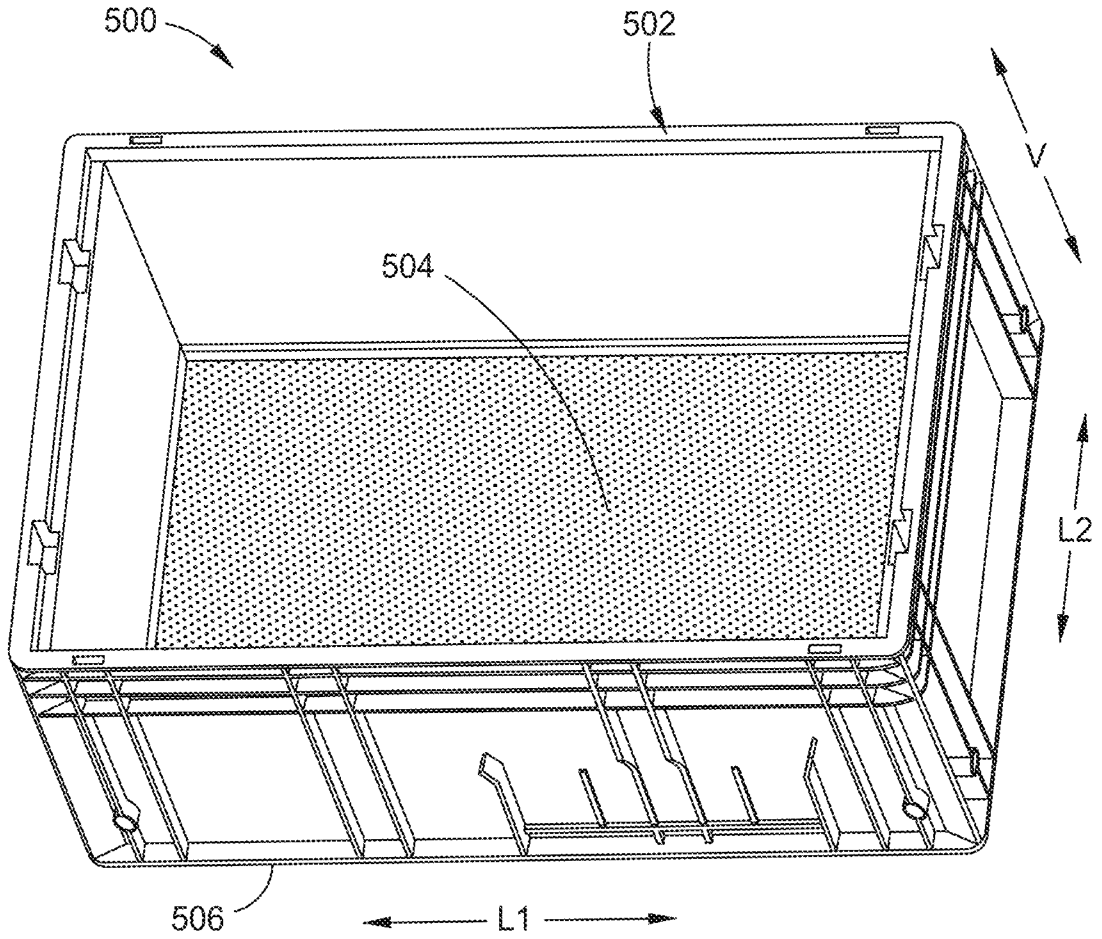
FIG. 5A is a perspective view of a hauling container having a body with a lining, according to one or more aspects of the present disclosure.

FIG. 5A is a perspective view of a hauling container 500 having a body 502 with a lining 504. In the depicted example of FIG. 5A, the lining 504 is arranged on a top surface of a floor wall 506 of the body 502. In at least one example, the lining 504 is formed of stainless steel or another stiffening material different than the thermoplastic material of the floor wall 506. In at least one example, the lining 504 is embedded within the floor wall 506.

Figure 5B:
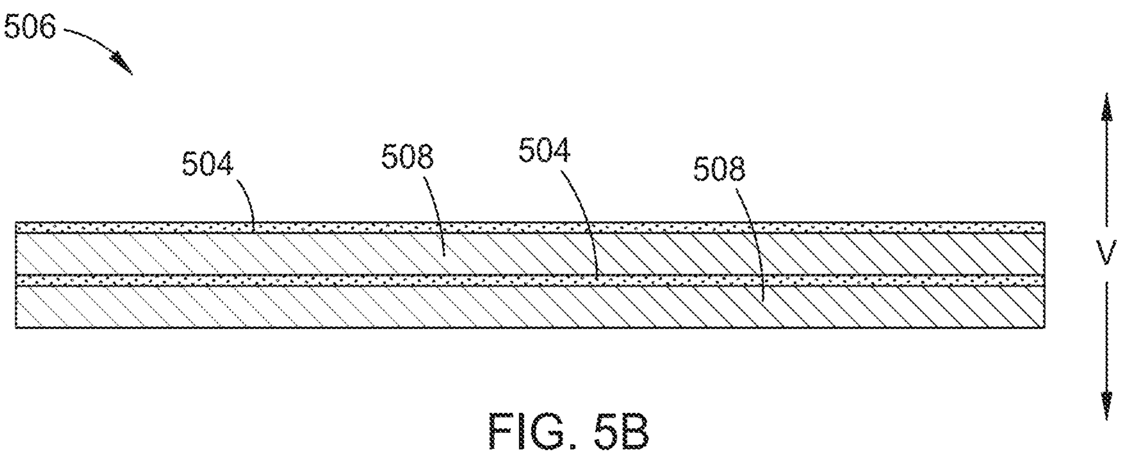
FIG. 5B is a cross-sectional view of a wall of a hauling container, with the wall having a stacked arrangement, according to one or more aspects of the present disclosure.

FIG. 5B is a cross-sectional view of one example floor wall 506 having a stacked arrangement. In one or more examples, as shown in FIG. 5B, the floor wall 506 includes multiple linings 504 disposed in a stacked arrangement along the vertical direction V. The linings 504 of the stacked arrangement can be spaced from one another, e.g., along the vertical direction V by thermoplastic layers 508 interposed therebetween. In at least one example, the one of the linings 504 can form a top surface of the floor wall 506, e.g., as shown in FIG. 5B, which can help protect the thermoplastic layers 508. While there are two (2) linings 504 and two (2) thermoplastic layers 508 forming the floor wall 506 in FIG. 5B, in other examples, the floor wall 506 can have more than two (2) linings 504 and more than two (2) thermoplastic layers 508.

Further, in one or more examples, the interior sides of the forward wall, the rear wall, the first side wall, and/or the second side wall can be reinforced with a lining. In yet other examples, the side walls are all formed primarily of a polymer material or a non-metallic recyclable material, or both, and the floor wall is formed primarily of a metallic material, such as iron, steel, stainless steel, titanium, aluminum, an aluminum alloys, or the like.

In one or more other examples, a hauling container includes a body that defines multiple compartments, or rather, delineates the storage volume into dedicated sections. Examples are provided below.

Figure 6A:
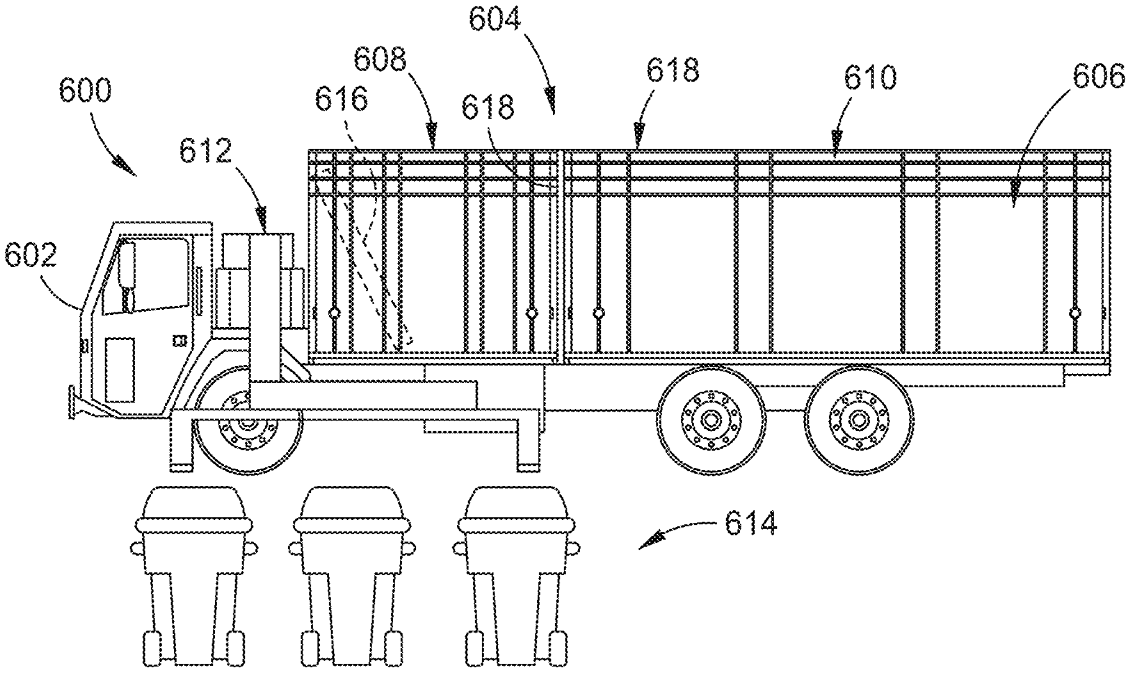
FIG. 6A is a side view of a vehicle having a hauling container, according to one or more aspects of the present disclosure.

FIG. 6A depicts a side view of a vehicle 600, according to one or more aspects of the present disclosure. In the depicted example of FIG. 6A, the vehicle 600 is a refuse vehicle. The vehicle 600 includes a cab 602 and a hauling container 604 arranged aft of the cab 602. In this example, the hauling container 604 is a refuse container. The hauling container 604 has a body 606 having multiple sections, including a hopper 608 and a storage compartment 610. The body 606 is formed of a lightweight material, such as a thermoplastic. In at least one example, the body 606 is formed of ABS or another thermoplastic material.

The vehicle 600 also includes an automatic side loader (ASL), or ASL 612, is arranged at a side of the vehicle 600 and can be used to engage user refuse containers 614, e.g., arranged on the side of a road, and to pick them up and dump the refuse into the hopper 608. A compaction system can be used to compact the refuse placed into the hopper 608 and a blade 616, paddle, or other mover mechanism can be used to move or urge the compacted refuse into the storage compartment 610. In this regard, the blade 616 is operable to move between a first position and a second position, or rather, a retracted position in which the blade 616 allows refuse into the hopper 608 and a deployed position in which the blade 616 is moved closer to the storage compartment 610 than when the blade 616 is in the retracted position. The blade 616 can be moved by a hydraulic actuators, pneumatic actuators, or electrical actuators, or some combination thereof.

In at least one example, the blade 616 is formed of ABS or another thermoplastic material. In at least one example, the blade 616 has a stacked arrangement with a thermoplastic layer arranged between two lining layers. The lining layers can be formed of stainless steel or another stiffening material different than the thermoplastic material of the thermoplastic layer. In yet other examples, the blade 616 can be formed of multiple thermoplastic layers, with each thermoplastic layer having at least one associated lining layer.

In at least one example, the body 606 that includes the hopper 608 and the storage compartment 610 can be a single, unitary monolithic component. The body 606 can have a forward wall, a rear wall, a floor wall, and first and second side walls. Further, the body 606 can have a divider wall 618 that divides the storage volume into a hopper chamber and a storage chamber. That is, the divider wall 618 separates the hopper 608 from the storage compartment 610. The divider wall 618 can extend between and connect the first and second sidewalls and can be arranged in plane parallel with the front and rear walls, for example. The divider wall 618 can form a pass-through opening, e.g., to allow compacted refuse within the hopper 608 to be moved into the storage compartment 610.

In one or more other examples, the hopper 608 and the storage compartment 610 can be formed by separate bodies. The separate bodies can be removably coupled with one another, e.g., by a bolted connection, as well as with a chassis of the vehicle 600.

Figure 6B:
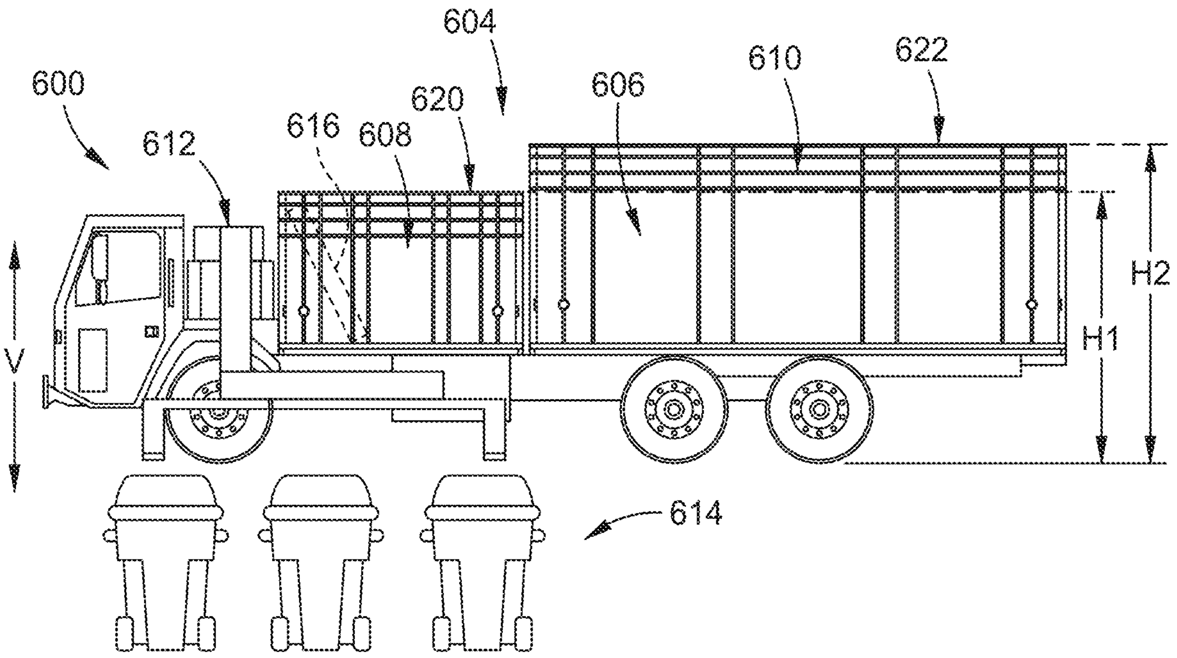
FIG. 6B is a side view of a vehicle having a hauling container, according to one or more aspects of the present disclosure.

In FIG. 6A, the hopper 608 and the storage compartment 610 are arranged at a same height along the vertical direction V. That is, the top end of the storage compartment 610 is arranged at the same height as the top end of the hopper 608. However, in other examples, as shown in FIG. 6B, the hopper 608 can be arranged at a different height than the storage compartment 610. For instance, a top end 620 of the hopper 608 can be arranged at a height H1 and a top end 622 of the storage compartment 610 can be arranged at a height H2, with the height H2 being greater than the height H1. In the depicted example of FIG. 6B, the hopper 608 and the storage compartment 610 can be formed of a single, unitary monolithic body or can be formed by separate bodies, e.g., which can be removably coupled with one another.

In some further examples, arms and accessories can be snapped onto the body 606, e.g., with steel wrapped connectors or steel loops. Recesses, undercuts, channels, etc. can be defined by the body to facilitate connection of the arms and accessories via the connectors or loops.

Figure 7:
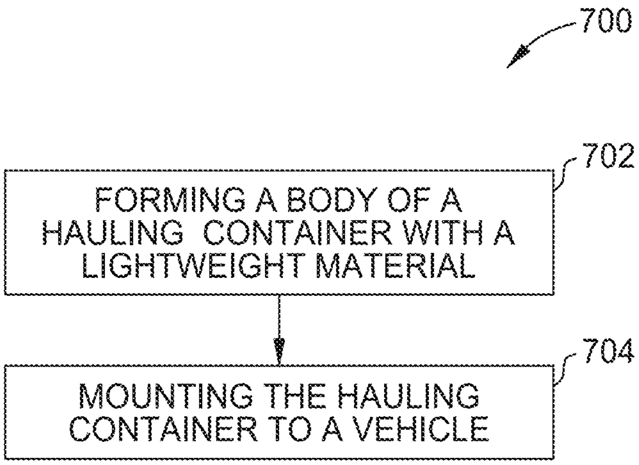
FIG. 7 is a flow diagram for a method, according to one or more aspects of the present disclosure.

FIG. 7 is a flow diagram for a method 700 of forming a hauling container, according to one or more aspects of the present disclosure. For instance, the method 700 can be used to form any of the hauling containers disclosed herein.

At 702, the method 700 includes forming a body of a hauling container with a lightweight material. In at least one example, a body of a hauling container is formed with a plurality of walls to define a storage volume of at least two cubic yards, with the walls being formed, at least in part, with a lightweight material. The lightweight material is lightweight relative to steel. In at least one example, the body is formed with walls to define a storage volume of at least ten cubic yards.

In at least one example, the body is formed of a thermoplastic, such as ABS or PDCPD. In yet other examples, the body 202 is formed of an LE linen phenolic material, Noryl®, Nylon, Torlon® polyamide-imide (PAI), Polybutylene terephthalate (PBT), polyetheretherketone (PEEK), Polyethylene terephthalate (PET), acetal, acrylic, CE canvas phenolic, DuPont Vespel® polyimide, G10/FR-4 Glass Epoxy, GPO-3 Thermoset, high impact polystyrene, Polyethylene terephthalate glycol (PETG), polycarbonate, polycarbonate film, polyester film, polyphenylene sulfide (PPS), polyphenylsulfone (PPSU), polysulfone (PSU), Ultem®, XX paper phenolic, or some combination thereof. In at least one example, the body is formed of a composite recycled plastic. In at least one example, the body is formed, at least in part, of a paper material. In at least one example, the body is a hybrid or composite body formed of a plastic material as the matrix material, and steel, stainless steel, titanium, aluminum, an aluminum alloys, or the like as the reinforcing material.

In some implementations, in forming the body at 702, one or more stiffening elements can be coupled with, or embedded within, one or more walls of the body. For instance, rods, beams, linings, etc. can be coupled with, or embedded within one or more of the walls. In some implementations, in forming the body at 702, ribs, recesses, undercuts, etc. can be formed in the body to allow for vibration damping as well as arms and accessories to be snapped thereon, e.g., with steel wrapped connectors.

In some implementations, the body can be formed by an injection molding process. In some other implementations, the body can be formed by an extrusion process. In other implementations, the body can be formed by an additive manufacturing process (e.g., by 3D printing). In yet other implementations, the body can be formed by a thermoforming process. In some implementations, the body can be formed by a stamping process. In some further implementations, the body can be formed by a rotational molding process. In some further implementations, the body can be formed by a manual process, wherein the walls are formed individually and then coupled together.

In some implementations, the body can be formed using RIM (e.g., a RIM process to form the body using a PDCPD). In other embodiments, the body can be formed by performing RIM plus a spray-up/lay-up process. RIM is a distinctive manufacturing process used to create large, complex parts made of polyurethane. This advanced technique involves the high-pressure mixing and injection of reactive liquid components. In one embodiment, a polyol and an isocyanate, are injected into a mold, where they react and solidify.

The spray-up (or spray lay-up) process is a fast, open-mold composite manufacturing technique where a spray gun simultaneously sprays liquid resin parts and chopped fiberglass (or other fibers) roving onto a mold surface and building layers. It's an extension of hand lay-up, faster but less uniform. Rollers compact the material and remove trapped air, resulting in cost-effective manufacturing with random fiber orientation and a smooth finish after curing. In one embodiment, the spray-up process is performed after performing the RIM process. Advantages of performing the spray-up process after RIM is improved rigidity, strength, and a polished finish of the body.

In general, the body can be formed using any one of (or a combination of) injection molding, RIM, thermal forming, vacuum forming, pressure forming, extrusion, or plastic fabrication.

In one or more examples, the floor wall, the forward wall, the rear wall, and the side walls of the body are formed as a single, unitary monolithic component by an injection molding process. Then, the rear wall is cut away from the unitary monolithic component. Thereafter, the rear wall is reattached to the unitary monolithic component, e.g., by way of hinges or other mechanical structures that allow the rear wall to move relative to the unitary monolithic component. Such a process can produce a hauling container having a rear wall that is molded specifically to the remainder of the body.

In some implementations, at 702, the body can be formed so that at least two walls of the body are formed as a unitary monolithic component. For instance, a floor wall and a side wall can be formed as a unitary monolithic component, a side wall and a forward wall can be formed as a unitary monolithic component, a rear wall and a roof wall can be formed as a unitary monolithic component, etc. In some implementations, all of the walls of the body can be formed as a unitary monolithic component.

In some implementations, at 702, the body can be formed with a plurality of walls, with the walls being separate components. The walls can be attached or otherwise coupled together, e.g., using mechanical fasteners, adhesives, bonding, interlocking joints (e.g., dovetails), some combination thereof, etc. In this regard, the walls can be formed as wall modules, and the walls modules can be coupled together to form the body. In at least one example, each wall can be formed by an extrusion process and then coupled together to form the body. In at least one example, a floor wall and a pair of opposed sidewalls can be extruded as a single monolithic component, and then the forward wall and the rear wall can be coupled thereto at the front and rear ends, respectively. Thus, in such implementations, forming the body includes extruding a unitary monolithic component having a floor wall, a first side wall, and a second side wall arranged opposite the first side wall, with the first side wall and the second side wall each connected to the floor wall, and coupling a wall (e.g., a forward wall or a rear wall) to each of the first side wall, the second side wall, and the floor wall.

At 704, optionally, the method 700 includes mounting the hauling container to a vehicle. In at least one example, the vehicle is a refuse truck, a dump truck, a box truck, a garbage truck, a waste collection truck, a sanitation truck, a recycling truck, or some other type of truck operable to haul objects. In at least one example, the vehicle is a watercraft. In at least one example, the vehicle is an aircraft. In at least one example, the vehicle is a locomotive or a train car coupled with the locomotive.

In at least one example, the hauling container is removably mounted to a chassis or other mounting platform of a vehicle, such as to the frame rails of a truck. The hauling container is "removably mounted" to the chassis such that the hauling container can be removed from the chassis at the end of the lifespan of the hauling container, without permanently fixing the hauling container to the chassis, such as by welding. In at least one implementation, the body is secured to the chassis via fasteners, brackets, etc. In at least one implementation, the body is slid onto the frame rails of the chassis and then locked in place.

To remove the slidable body from the chassis, the body can be unlocked and slid off the frame rails. In some example implementations, wheels, rollers, or the like can be mounted to the body to facilitate the sliding of the body onto the frame rails of the chassis. In yet other implementations, a forklift or crane can be used to lift the unlocked body from the frame rails.

Various hauling containers have been disclosed herein having a body formed of a lightweight thermoplastic material. This disclosure applies to various types of hauling containers. For instance, the inventive aspects described herein can apply to refuse containers, intermodal containers (i.e., shipping containers), storage containers (e.g., movable storage pods), cargo containers, and the like. In this regard, the inventive aspects can apply to many types of hauling containers.

Further, while the bodies of the hauling containers are primarily depicted herein as rectangular cuboids, the aspects of the present disclosure also apply to bodies having other geometries. For instance, the aspects of the present disclosure also apply to hauling containers having bodies shaped as cylindrical cuboids, as well as other irregular shapes.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s).

In view of the foregoing, the scope of the present disclosure is determined by the claims that follow.

I claim:

1. A hauling container, comprising:

a body defining a storage volume, wherein the body is configured to mount to a refuse truck chassis and comprises at least one of a polymer material or a non-metallic recyclable material, wherein the body comprises at least a bottom, a roof, and four side walls, wherein the roof or one of the four side walls defines an opening for receiving refuse, wherein the storage volume is greater than four cubic yards, and wherein the body comprises (i) a first piece that is a unitary monolithic component forming part of the bottom and at least two of the four side walls of the body and (ii) a second piece that couples to a first side, a second side, and a third side of the unitary monolithic component.

2. The hauling container of claim 1, wherein the unitary monolithic component forms part of the roof of the body.

3. The hauling container of claim 1, wherein the body weighs less than 2,000 pounds.

4. The hauling container of claim 1, wherein the body has stiffening elements coupled with, or embedded within, one or more walls of the body to provide structural reinforcement thereto.

5. The hauling container of claim 1, wherein the body has at least one wall formed of a thermoplastic matrix combined with steel rods supported by shear stirrups.

6. The hauling container of claim 1, wherein the body has at least one wall with a beam extending therethrough, and wherein the beam includes a beam matrix combined with steel rods supported by shear stirrups, and wherein the beam includes, or is wrapped in whole or in part by, a fabric layer.

7. The hauling container of claim 1, wherein the body has a floor wall having a lining arranged on a top surface thereof.

8. The hauling container of claim 1, wherein the body has a floor wall having a stacked arrangement with a thermoplastic layer arranged between two lining layers.

9. The hauling container of claim 1, wherein the storage volume is divided into at least two compartments, with a divider wall separating the at least two compartments.

10. The hauling container of claim 1, further comprising:

a blade operable to move between a first position and a second position.

11. The hauling container of claim 1, wherein the hauling container is removably mountable on a refuse truck.

12. A refuse truck, comprising:

a chassis; and a hauling container removably mounted to the chassis and having a body defining a storage volume, wherein the body comprises at least one of a polymer material or a non-metallic recyclable material, wherein the body comprises at least a bottom, a roof, and four side walls, wherein the roof or one of the four side walls defines an opening for receiving refuse, wherein the body comprises (i) a first piece that is a unitary monolithic component forming part of the bottom and at least two of the four side walls of the body and (ii) a second piece that couples to a first side, a second side, and a third side of the unitary monolithic component, wherein the storage volume is greater than four cubic yards.

13. The refuse truck of claim 12, further comprising:
an automatic loader mounted to the body, the automatic loader being operable to pick up one or more offboard objects and move the offboard objects into the storage volume.

14. The refuse truck of claim 12, wherein the body has multiple sections, including a hopper and a storage compartment.

15. The refuse truck of claim 14, wherein a top end of the hopper is arranged at a different height than a top end of the storage compartment, and wherein the hopper and the storage compartment are formed as a unitary monolithic component.

16. A method, comprising:
forming a body of a hauling container, the body defining a storage volume and being formed, at least in part, of a polymer material or a non-metallic recyclable material, wherein the body is configured to mount to a chassis of a refuse truck and wherein the body comprises at least a bottom, a roof, and four side walls, wherein the roof or one of the four side walls defines an opening for receiving refuse, wherein the storage volume is greater than four cubic yards, wherein forming the body comprises:
extruding a unitary monolithic component that is a first piece of the body, the first piece forming part of the bottom and at least two of the four side walls; and
coupling a second piece of the body to a first side, a second side, and a third side of the unitary monolithic component.

17. The method of claim 16, wherein
the unitary monolithic component forms a part of the roof, the method further comprises:
coupling the second piece to a fourth side of the unitary monolithic component that forms part of the roof.

18. The method of claim 16, further comprising:
removably mounting the hauling container onto the refuse truck.

19. The method of claim 16, wherein forming the body is performed using a combination of reaction injection molding (RIM) and a spray-up process.

20. The method of claim 16, wherein forming the body comprises performing injection molding.

21. The method of claim 16, wherein forming the body comprises performing RIM.

22. The method of claim 16, wherein forming the body comprises performing thermal forming.

23. The method of claim 16, wherein forming the body comprises performing vacuum forming.

24. The method of claim 16, wherein forming the body comprises performing pressure forming.

25. The method of claim 16, wherein forming the body comprises performing extrusion.

26. The method of claim 16, wherein forming the body comprises performing plastic fabrication.

27. The hauling container of claim 1, wherein the body comprises a second unitary monolithic component forming a hopper, wherein the hopper is coupled to the first piece of the body.

28. The hauling container of claim 1, wherein the first side is arranged opposite the second side and both the first side and the second side are coupled to the third side, wherein the third side forms part of the bottom of the body.

29. The hauling container of claim 1, wherein the body comprise at least one of acrylonitrile butadiene styrene (ABS) or Polydicyclopentadiene.

* * * * *